A. S. CUBITT.
THERMOSTAT.
APPLICATION FILED JUNE 16, 1910.

1,010,414.

Patented Dec. 5, 1911.

Witnesses:
George H. Tilden
J. Ellis Glen

Inventor:
Archibald S. Cubitt,
by Albert H. Davis
His Attorney.

UNITED STATES PATENT OFFICE.

ARCHIBALD S. CUBITT, OF PITTSFIELD, MASSACHUSETTS, ASSIGNOR TO GENERAL ELECTRIC COMPANY, A CORPORATION OF NEW YORK.

THERMOSTAT.

1,010,414.  Specification of Letters Patent.  Patented Dec. 5, 1911.

Application filed June 16, 1910. Serial No. 567,147.

*To all whom it may concern:*

Be it known that I, ARCHIBALD S. CUBITT, a subject of the King of Great Britain, residing at Pittsfield, county of Berkshire, State of Massachusetts, have invented certain new and useful Improvements in Thermostats, of which the following is a specification.

This invention relates to thermostatic controlling devices, and has for its object the provision of a device of this character which will operate to effect certain desired results in a reliable and efficient manner upon a predetermined variation of temperature.

My invention relates more specifically to thermostatic switches for controlling electric circuits. In devices of this character, one of the great difficulties which has heretofore been encountered is in the provision of suitable means for causing the switch to operate quickly; that is, with a snap action. This is especially true where the thermostat has more than one operative position, and the snap action is desirable in all positions. In carrying out my invention, therefore, I provide a thermostatic controlling device which will operate with a snap action and will be mechanically locked in operative position. I also provide means whereby the controlling device may have more than one operative position; the arrangements being such that the controlling element will be positively locked in each position and will be released from this position at a predetermined temperature with a snap action. I accomplish this result by having the thermostatic switch element controlled by one or more thermostatic locking elements. The thermostatic switch element gives the device the necessary bias or tendency to open, while the thermostatic locking element releases the switch element at a predetermined temperature. Where the device is arranged with two operative positions, I provide two thermostatic locking elements so arranged that when the switch element is released from one position it will snap to the opposite position and be locked by the other thermostatic locking device. Upon another predetermined change of temperature, the switch element will be again released and return with a snap action to the first position as before.

Figure 1:
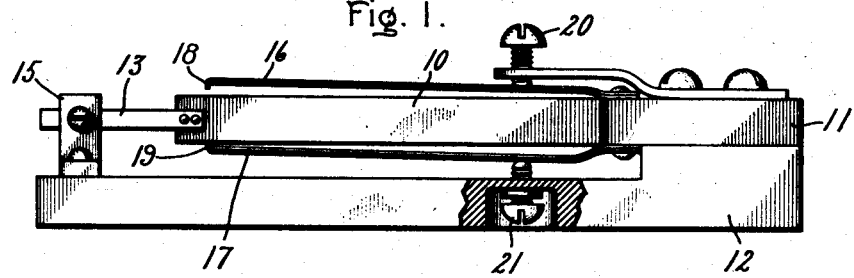
Figure 2:
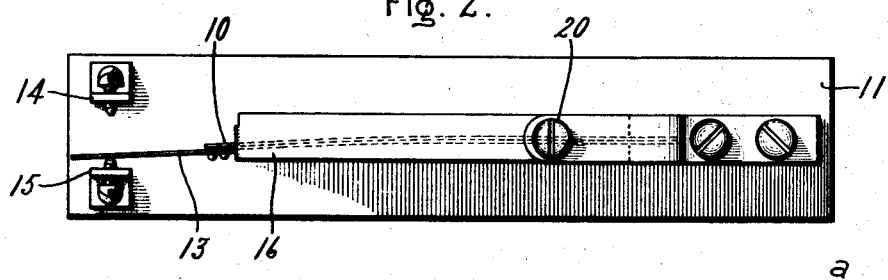
Figure 3:
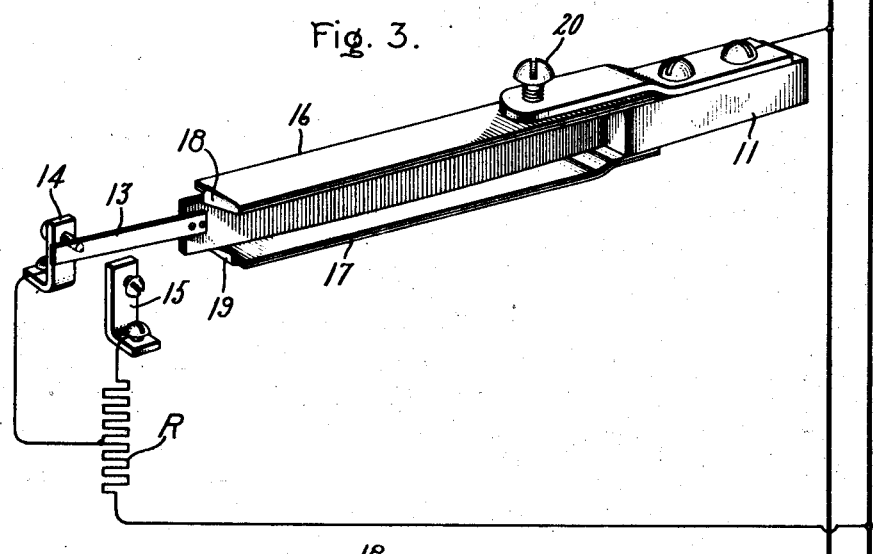
Figure 4:
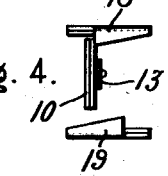

In the accompanying drawing, in which I have shown my invention embodied in concrete form, Figure 1 represents a side view of my device, partly broken away; Fig. 2 represents a plan view of the same; Fig. 3 is a perspective view showing the circuit connections; and Fig. 4 shows the arrangement of the thermostatic latches in detail.

Referring to the drawing, 10 represents a thermostatic element having one end affixed to a block of metal 11 mounted upon the base 12. This thermostatic element may be the compound type well known in the art, which bends in one direction when heated and in the opposite direction when cooled. The free end of the element 10 is provided with a contact strip 13 arranged to move between the adjustable contacts 14 and 15. Secured to the block 11 on each side of the element 10 are two thermostatic strips 16 and 17. The planes of the two strips are at right angles to the plane of the element 10 and they are provided with latches for locking the contact strip 13 in engagement with the contacts 14 and 15, respectively. The end of the strip 16 is bent downward to form a lock or latch 18 beveled as shown so as to lock the contacts 13 and 14 in engagement, while the strip 17 has a similar latch 19 beveled in the opposite direction so as to lock the contacts 13 and 15 in engagement. Adjusting screws 20 and 21 are arranged, as shown, to vary the distance between the latches and the thermostatic element and thereby vary the temperature at which the element will be released. The two thermostatic strips 16 and 17 are arranged so that they move parallel with each other; that is, when latch 18 moves upward away from the element 10 the latch 19 likewise moves upward, but into engagement with the element. In Fig. 3 I have shown my device connected in circuit so as to control the resistance R. One side of the line *a* is connected with the block 11 and the other side of the line *b* is connected with the resistance R. The contact 14 is connected with an intermediate point of the resistance R, while the contact 15 is connected with the end of the resistance.

The operation of my device is as follows: Assuming that the device stands normally with the contact strip 13 between the two contacts 14 and 15, when the temperature rises the element 10 will be bent into the position shown in Fig. 2 and will be locked in this position by the latch 19. This latch 19 has been moved upward to engage the element 10 by the rise in temperature, and the latch 18 has been likewise moved upward as shown in Fig. 1. When the thermostat cools off the element will tend to bend in the opposite direction but will be restrained by the latch 19. In the meantime the cooling off of the thermostat gradually lowers the latches 19 and 18, so that when a predetermined temperature is reached the element will be released and snap over into engagement with the contact 14. In this position it will be held by the latch 18 which has moved downward to engage it. By this arrangement the element is automatically locked in either position and always moves with a snap action. The temperature at which the device operated may be varied by means of the adjusting screws 20 and 21. It will thus be seen that I have provided a simple and reliable thermostatic switch which will be capable of fine adjustment and which will operate with a snap action in one or more positions.

While I have described my invention as embodied in concrete form for purposes of illustration, it will be understood that I do not limit my invention thereto, since various modifications will suggest themselves to those skilled in the art without departing from the spirit thereof, the scope of which is set forth in the annexed claims.

What I claim as new and desire to secure by Letters Patent of the United States, is,—

1. A switch comprising a thermostatic switch element and a thermostatic locking element for engaging the same.

2. A switch comprising a thermostatic switch element and a thermostatic element for locking and releasing the same.

3. A switch comprising a movable thermostatic switch element having two operative positions, and thermostatic means for controlling the movement thereof in each position.

4. A switch comprising a thermostatic switch element having two operative positions, and thermostatic means for locking the switch element in each position.

5. A switch comprising a thermostatic element having two operative positions, and means for automatically releasing said element from either of said positions and mechanically locking it in the other position on predetermined variation in temperature.

6. A switch comprising a thermostatic element having two operative positions, and thermostatically controlled means for automatically releasing said element from either of said positions and locking it in the other position on predetermined variations in temperature.

7. A switch comprising a movable thermostatic switch element, and a thermostatic locking element movable in a plane perpendicular to the plane of movement of said switch element.

8. A switch comprising a movable thermostatic switch element having two operative positions, and two thermostatic elements one for locking the switch element in each position, said elements being movable in a plane perpendicular to the plane of movement of the said switch element.

9. A switch comprising a movable thermostatic switch element having two operative positions, and two thermostatic locking elements one for locking the switch element in each position, said elements being each provided with a latch for engaging the switch element.

10. A switch comprising a movable thermostatic switch element, and a thermostatic locking element provided with a latch for engaging the switch element.

In witness whereof, I have hereunto set my hand this 13th day of June, 1910.

ARCHIBALD S. CUBITT.

Witnesses:
T. P. THOMPSON,
F. G. LARAMEE.